Jan. 10, 1967 C. L. ROBERTS Re. 26,139

MOUTHPIECE FOR DOUBLE REED MUSICAL INSTRUMENTS

Original Filed Oct. 10, 1963

INVENTOR.

CHARLES L. ROBERTS

BY

Merchant, Merchant & Gould

ATTORNEYS

United States Patent Office

Re. 26,139

Reissued Jan. 10, 1967

26,139

MOUTHPIECE FOR DOUBLE REED MUSICAL INSTRUMENTS

Charles L. Roberts, Box 325, Chamberlain, S. Dak. 57101

Original No. 3,152,506, dated Oct. 13, 1964, Ser. No. 315,217, Oct. 10, 1963. Application for reissue Mar. 31, 1966, Ser. No. 544,652

10 Claims. (Cl. 84—383)

Matter enclosed in heavy brackets [ ] appears in the original patent but forms no part of this reissue specification; matter printed in italics indicates the additions made by reissue.

My invention relates to mouthpieces for double reed instruments such as oboes, English horns, and bassoons.

It is well known that the best tones are derivable from such instruments when used in connection with mouthpieces utilizing hand-made double reeds. However, such reeds must, of necessity, be scraped, cut, and adjusted by specialists to make them respond properly. In view of the paucity of such specialists, considerable effort has been expended to produce a satisfactory mouthpiece which avoids the necessity of cutting, scraping, and adjusting of reeds utilized therewith. One result of these efforts has been the development of a single reed mouthpiece utilizing machine-made reeds. However, such mouthpieces are not looked upon with favor by directors, teachers, and professional musicians because of the relatively poor tone qualities produced thereby.

The primary object of my invention is the provision of a mouthpiece utilizing two laterally spaced reed elements which will produce tones of a quality uniformly equal to the best tones producible by the manually scraped, cut, and adjusted reeds heretofore produced only by specialists.

A further object of my invention is the provision of a device of the class immediately above described which will utilize reed elements which may be machine manufactured at a cost far less than the cost of reeds heretofore utilized for this purpose, and which are uniform in thickness and behavior characteristics.

A still further object of my invention is the provision of a device of the class above described in which the reed elements may be quickly replaced even by a novice with a minimum of skill and instruction.

A still further object of my invention is the provision of a double reed mouthpiece which is so easy for even the inexperienced to become accustomed to and to use that it takes double reed instruments out of the class of the "hard-to-play instruments" and makes them available to substantially anyone with interest therein.

The above and still further objects of my invention will become apparent from the following detailed specification, appended claims, and attached drawings.

Referring to the drawings wherein like characters indicate like parts throughout the several views.

Figure 1:
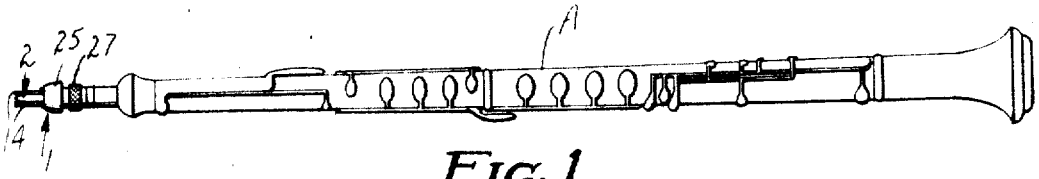
FIG. 1 is an elevational view of an oboe showing my novel two-reed mouthpiece secured thereto.

Referring with greater particularlity to the drawings wherein an oboe is identified generally by A, the numeral 1 indicates generally my novel mouthpiece. Mouthpiece 1 includes an elongated body 2, the intermediate portion

3 of which is formed to define spaced generally parallel planar reed-supporting side surfaces 4. The inner end 5 of body 2 is tubular and, as shown, is circular in cross section, and is hereinafter referred to as the stem. A passage 6 extending through the stem 5 and the intermediate body portion 3 progressively tapers in an outward direction, and is of a size at its extreme inner end 7 to snugly telescopically receive the outwardly tapering staple 8 of the oboe or other double reed instrument A.

Body 2 also includes a pair of laterally spaced longitudinally outwardly extended rail elements 9, the inner ends of which are disposed one on each side of the axially extended passage 6. Rail elements 9 are connected together at their outer ends by a tie-bar 10. As shown particularly in FIGS. 4 and 5, the rail elements 9 are formed, immediately adjacent their opposed inner edges 11, to define planar surfaces 12 which are coplanar with and form extensions of the planar surfaces 4 defined by the intermediate body portion 3.

Laterally outwardly of said planar surfaces 12, said rail elements 9 taper to relatively feathered edges 13 whereby to define a generally lenticular cross-sectional shape.

Figure 3:
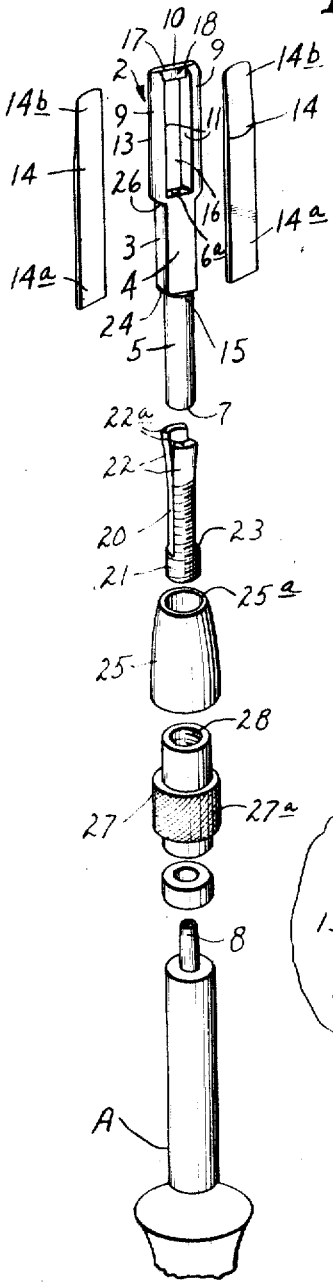
FIG. 3 is an exploded view of the structure of FIG. 2 on a slightly reduced scale.
Figure 5:
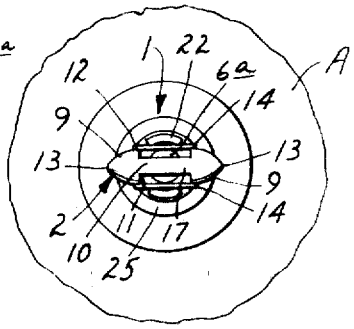
FIG. 5 is an enlarged view in end elevation as seen from left to right of FIG. 1.
Figure 2:
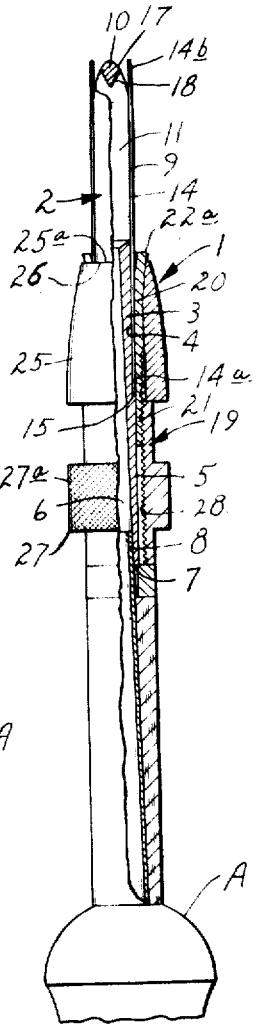
FIG. 2 is an enlarged fragmentary view in elevation of the mouthpiece-equipped end of the structure of FIG. 1, some parts being broken away and shown in section.

As shown particularly in FIGS. 2, 3, and 5, reed elements 14 are adapted to overlie and engage at planar surfaces 4, 12 with their inner end portions 14a in abutting relationship to diametrically spaced shoulders 15 (only one of which is shown in FIG. 2) formed by the outer end portion of the cylindrical tubular stem 5. With the reed elements 14 in said operative positions, they cooperate with the outer end of the intermediate body section 3, the spaced rails 9, and the tie-bar 10 to define a tone chamber 16.

Figure 4:
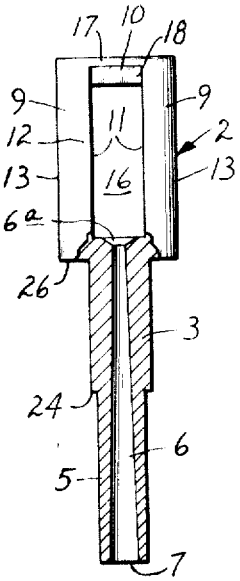
FIG. 4 is an enlarged view in plan of the mouthpiece body shown in FIG. 3, some parts being broken away and shown in section.

It will be noted that the tie-bar 10 and the outer end portions of the rails 9 have outwardly converging side surfaces 17 which are provided with outwardly opening notches 18 intermediate the rails 9. The notches 18, together with the overlying outer end portions of the reed elements 14b provide longitudinally extended air passages communicating at their inner ends with the tone chamber 16 and which extend through said converging surfaces to atmosphere at their outer ends. Referring specifically to FIG. 4, it will be noted that the outwardly tapering passage 6 is provided at its outer end with a diametrically enlarged frustoconical mouth 6a which, together with the tapering passage 6, reduce obstruction, and consequent reverberation, of sound waves passing from said tone chamber 16 to the instrument A to a minimum.

For the purpose of securing the reed elements 14 in the operative relationship immediately above described, I provide a novel ligature means in the nature of a collet, indicated generally by the numeral 19. Collet 19 comprises a tubular sleeve 20 having a screw-threaded exterior and defining at its lower end a generally cylindrical portion 21. The outer end portion of the sleeve 20 is bifurcated to define diametrically opposed collet fingers 22. Sleeve 20 is slidably received upon a cylindrical stem 5 with the shoulder portions 23 thereof in engagement with shoulders 24 formed on the longitudinally inner end of the intermediate body portion 3. With this arrangement the fingers 22 are positioned in overlying relationship to the inner ends 14a of the inner end portions of the reed elements 14 and with the extreme outer ends 22a of the fingers 22 terminating adjacent the inner ends of the rail elements 9. A clamping collar 25 is slidably received over the fingers 22 and outward clamping movement thereof is limited by engagement of its outer end 25a with shoulders 26 defined by the longitudinal inner ends of the rail elements 9. It will be noted that the extreme outer end portions of the fingers 22a of the fingers 22 are flared outwardly so as to concentrate clamping pressure of the fingers 22 upon the reed elements 14, intermediate the inner and outer limits of said collar 25. For the purpose of imparting relative sliding movements to the collar 25 with respect to the clamping fingers 22 of the sleeve 20, I provide an elongated nut 27 which is internally threaded as at 28 for threaded reception of the lower end portion 21 of the sleeve 20. Rotation of the nut 27 in one direction obviously causes withdrawing-clamping movements to be imparted to the fingers 22, whereas movement in the opposite direction imparts advancing and releasing movements thereto. For the purpose of facilitating rotation of the nut 27, the cylindrical surface 27a thereof may be knurled or otherwise roughened.

My invention has been thoroughly tested and found to be entirely satisfactory for the accomplishment of the above objects; and while I have disclosed a preferred embodiment thereof, my invention may be capable of modification without departure from the scope and spirit of the appended claims.

What is claimed is:

1. In a mouthpiece for a double reed instrument, (a) an elongated body having an intermediate portion providing spaced parallel planar reed-supporting surfaces, (b) a tubular stem on the inner end of said body adapted to telescopically receive the staple of said instrument, (c) said stem and said intermediate body portion defining a longitudinally extended passageway therethrough, (d) a pair of laterally spaced rail elements projecting longitudinally outwardly from the said intermediate body portion, one on each side of said passageway and having opposite side surfaces which are coplanar with and form extensions of the planar surfaces of said intermediate body portion, (e) a tie-bar connecting the extreme outer ends of said rail elements and cooperating with said intermediate body portion, said rail elements and a pair of reeds supported on said planar surfaces to provide a tone chamber, (f) said tie-bar intermediate said rail elements being formed to define laterally outwardly opening notches which cooperate with the reed elements supported on said planar surfaces to define longitudinally extended air passages between said tone chamber and atmosphere, and (g) ligature means longitudinally inwardly of said tone chamber for clamping the inner end portions of reed elements supported on said planar surfaces to said body.

2. The structure defined in claim 1 in which said means comprises a collet, including (a) an externally threaded sleeve bifurcated at its outer end to define diametrically opposed collet fingers one each adapted to overlie and engage a reed element in engagement with one of said planar surfaces, (b) a collar slidably received on said sleeve, (c) and a tubular nut, (d) said tubular nut being internally threaded at its outer end to receive the threaded inner end of said sleeve and having abutment means for engagement with said collar whereby to cause said collar to impart clamping movements to the fingers, and (e) said tubular nut at its inner end loosely encompassing said stem.

3. The structure defined in claim 1 in which the passageway through said intermediate and inner end portions of said body taper inwardly from said tone chamber.

4. The structure defined in claim 3 in which the diametrically reduced passageway terminates in a diametrically enlarged frusto-conical mouth.

5. The structure defined in claim 1 in which the extreme outer ends of said rail elements and said tie-bar have outwardly converging surfaces through which said notches extend.

6. The structure defined in claim 1 in which the cross sectional shape of said body adjacent said sound chamber is generally lenticular.

7. The structure defined in claim 1 in which the inner ends of said rail elements define shoulders for engagement with the outer end of said collar whereby to limit outward movements of said collar.

8. The structure defined in claim 7 in which the inner end of said intermediate body portion defines a shoulder for engagement with the cylindrical inner end of said sleeve whereby to limit forward movement of said sleeve beyond its operative clamping position wherein the projected forward ends of said fingers overlie said tone chamber.

9. The structure defined in claim 8 in which the outer end of said stem defines diametrically spaced shoulders which limit longitudinal inward movements of reed elements in engagement with said planar surfaces beyond their operative positions wherein the projected outer ends thereof terminate in substantially the plane of the extreme outer ends of said rails and tie-bar.

*10. In a mouthpiece for a double reed instrument:*

*(a) an elongated body having a portion providing spaced parallel planar reed-supporting surfaces;*

*(b) said body portion defining a longitudinally extended passageway therethrough;*

*(c) a pair of laterally spaced rail elements projecting longitudinally outwardly from the said body portion, one on each side of said passageway and having opposite side surfaces which are generally coplanar with and form extensions of the planar surfaces of said body portion;*

*(d) said body portion, said rail elements and a pair of reeds supported on said planar surfaces cooperating to provide a tone chamber;*

*(e) said rail elements being formed to define in cooperation with the reed elements supported on said planar surfaces a longitudinally extended air passage between said tone chamber and atmosphere; and*

*(f) means for clamping the inner end portions of the reed elements supported on said planar surface to said body.*

No references cited.

RICHARD B. WILKINSON, *Primary Examiner.*

C. M. OVERBEY, *Assistant Examiner.*